United States Patent
Shirotori et al.

(10) Patent No.: US 12,165,678 B2
(45) Date of Patent: Dec. 10, 2024

(54) MAGNETIC HEAD HAVING MULTIPLE SHIELDS AND MAGNETIC RECORDING DEVICE

(71) Applicant: KABUSHIKI KAISHA TOSHIBA, Tokyo (JP)

(72) Inventors: Satoshi Shirotori, Yokohama Kanagawa (JP); Tazumi Nagasawa, Yokohama Kanagawa (JP); Akira Kikitsu, Yokohama Kanagawa (JP); Yoshihiro Higashi, Komatsu Ishikawa (JP)

(73) Assignee: Kabshiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/354,959

(22) Filed: Jul. 19, 2023

(65) Prior Publication Data

US 2024/0257829 A1    Aug. 1, 2024

(30) Foreign Application Priority Data

Jan. 30, 2023    (JP) ................................. 2023-012148

(51) Int. Cl.
| | | |
|---|---|---|
| *G11B 5/39* | (2006.01) | |
| *G11B 5/11* | (2006.01) | |
| *G11B 5/127* | (2006.01) | |
| *G11B 5/48* | (2006.01) | |

(52) U.S. Cl.
CPC .............. *G11B 5/3912* (2013.01); *G11B 5/11* (2013.01); *G11B 5/398* (2013.01); *G11B 5/1272* (2013.01); *G11B 5/486* (2013.01)

(58) Field of Classification Search
None
See application file for complete search history.

(56) References Cited

U.S. PATENT DOCUMENTS

| | | | |
|---|---|---|---|
| 6,680,829 B2 * | 1/2004 | Chen et al. ............ | G11B 5/398 360/319 |
| 6,680,832 B2 * | 1/2004 | Fontana, Jr. et al. ....................... | G11B 5/3912 360/319 |
| 7,356,909 B1 * | 4/2008 | Min et al. ............ | G11B 5/3912 360/317 |
| 7,576,948 B2 | 8/2009 | Covington et al. | |

(Continued)

OTHER PUBLICATIONS

Xiaoyong Liu et al., "Dual Free Layer Reader for Future Recording Head," IEEE 33rd Magnetic Recording Conference (TMRC), DOI: 10.1109/TMRC56419.2022.9918608, 2 pages (2022).

*Primary Examiner* — Craig A. Renner
(74) *Attorney, Agent, or Firm* — Finnegan, Henderson, Farabow, Garrett & Dunner, LLP

(57) ABSTRACT

According to one embodiment, a magnetic head includes first to fourth shields, first to fourth terminals, and first magnetic member. The third shield includes a first partial region and a second partial region. The fourth shield includes a third partial region and a fourth partial region. The first magnetic member is provided between a portion of the first shield and a portion of the second shield in a first direction from the first shield to the second shield. The first magnetic member is provided between the first partial region and the third partial region in a second direction crossing the first direction. The portion of the first shield is located between the second partial region and the fourth partial region in the second direction.

19 Claims, 10 Drawing Sheets

(56) References Cited

U.S. PATENT DOCUMENTS

| | | | |
|---|---|---|---|
| 8,072,713 B2* | 12/2011 | Yamada et al. | G11B 5/3903 |
| | | | 360/324.2 |
| 9,087,535 B2* | 7/2015 | Singleton et al. | G11B 5/3912 |
| 9,293,160 B1 | 3/2016 | Mihajlovic et al. | |
| 9,520,147 B2* | 12/2016 | Zhou et al. | G11B 5/3912 |
| 11,100,946 B1* | 8/2021 | Le et al. | G11B 5/3912 |
| 11,170,808 B1 | 11/2021 | Liu et al. | |
| 2022/0115035 A1 | 4/2022 | Mao et al. | |

\* cited by examiner

MAGNETIC HEAD HAVING MULTIPLE SHIELDS AND MAGNETIC RECORDING DEVICE

CROSS-REFERENCE TO RELATED APPLICATIONS

This application is based upon and claims the benefit of priority from Japanese Patent Application No. 2023-012148, filed on Jan. 30, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head including a magnetic sensor. It is desired to improve the performance of the magnetic head.

DETAILED DESCRIPTION

Figure 1:
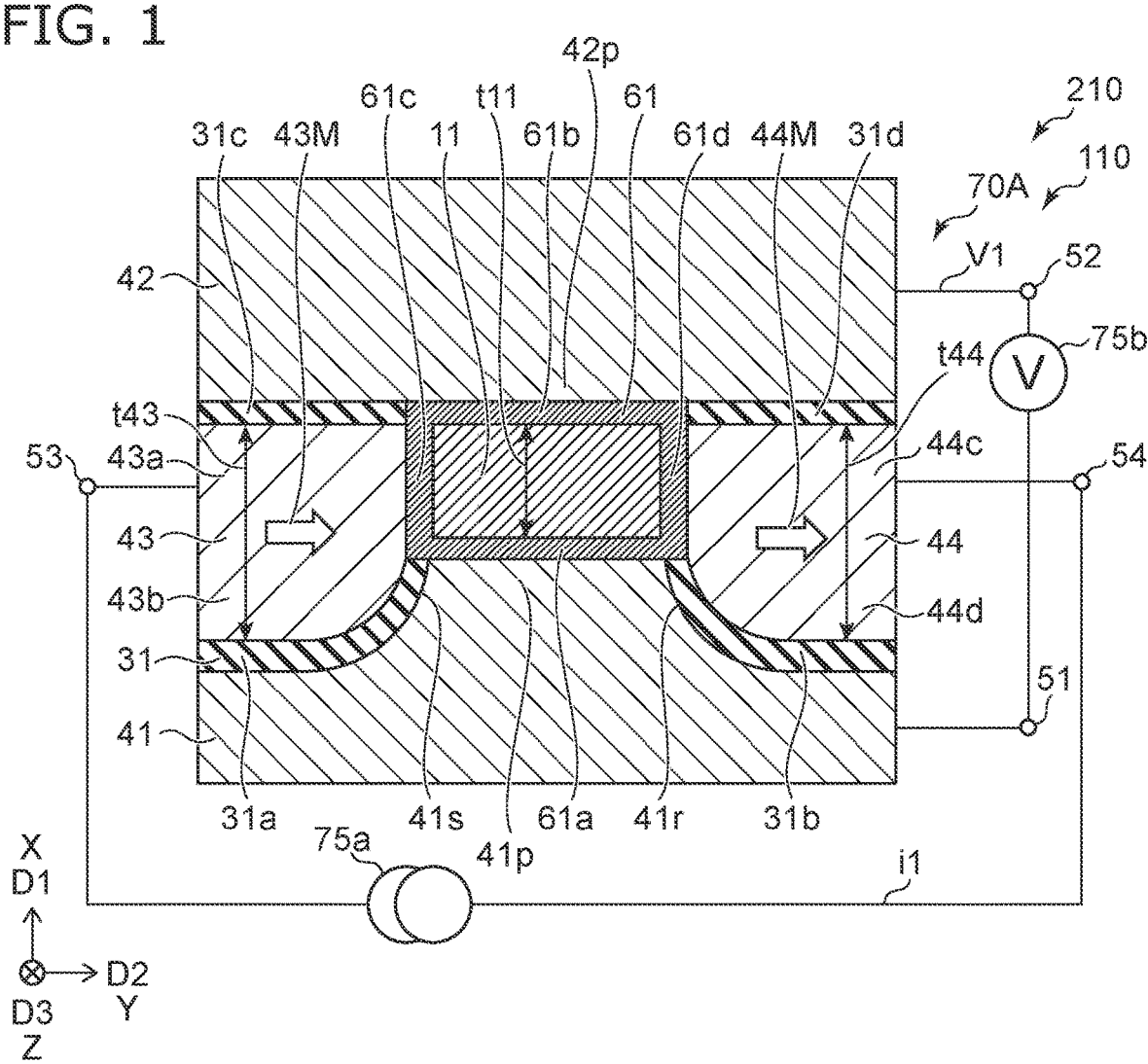
FIG. 1 is a schematic cross-sectional view illustrating a magnetic head according to a first embodiment.

According to one embodiment, a magnetic head includes a first shield, a second shield, a third shield, a fourth shield, a first terminal, a second terminal, a third terminal, a fourth terminal, and first magnetic member. The third shield includes a first partial region and a second partial region. The fourth shield includes a third partial region and a fourth partial region. The first terminal is electrically connected to the first shield. The second terminal is electrically connected to the second shield. The third terminal is electrically connected to the third shield. The fourth terminal is electrically connected to the fourth shield. The first magnetic member is provided between a portion of the first shield and a portion of the second shield in a first direction from the first shield to the second shield. The first magnetic member is provided between the first partial region and the third partial region in a second direction crossing the first direction. The portion of the first shield is located between the second partial region and the fourth partial region in the second direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

As shown in FIG. 1, a magnetic head 110 according to the embodiment includes a first shield 41, a second shield 42, a third shield 43, a fourth shield 44, a first terminal 51, a second terminal 52, a third terminal 53, a fourth terminal 54 and the first magnetic member 11. The first shield 41, the second shield 42, the third shield 43, the fourth shield 44, the first terminal 51, the second terminal 52, the third terminal 53, the fourth terminal 54, and the first magnetic member 11 are, for example, may be included in a magnetic sensor 70A.

The third shield 43 includes a first partial region 43a and a second partial region 43b. The fourth shield 44 includes a third partial region 44c and a fourth partial region 44d. The first terminal 51 is electrically connected to the first shield 41. The second terminal 52 is electrically connected to the second shield 42. The third terminal 53 is electrically connected to the third shield 43. The fourth terminal 54 is electrically connected to the fourth shield 44.

A first direction D1 from the first shield 41 to the second shield 42 is defined as an X-axis direction. One direction perpendicular to the X-axis direction is defined as a Y-axis direction. A direction perpendicular to the X-axis direction and the Y-axis direction is defined as a Z-axis direction. The X-axis direction is the down-track direction in the magnetic head 110. The Y-axis direction is the cross-track direction. The Z-axis direction is the height direction.

The first magnetic member 11 is located between a portion 41p of the first shield 41 and a portion 42p of the second shield 42 in the first direction D1.

In a second direction D2, the first magnetic member 11 is located between the first partial region 43a and the third partial region 44c. The second direction D2 crosses the first direction D1. The second direction D2 is, for example, the Y-axis direction.

The portion 41p of the first shield 41 is located between the second partial region 43b and the fourth partial region 44d in the second direction D2.

In the magnetic head 110, for example, a voltage V1 between the first terminal 51 and the second terminal 52 when a current i1 is supplied between the third terminal 53 and the fourth terminal 54 changes depending on a target magnetic field. The target magnetic field is a magnetization of a magnetic recording medium.

In embodiments, the third shield 43 and the fourth shield 44 become a part of the current path. As described above, the third shield 43 includes the first partial region 43a and the second partial region 43b. Thereby, the third shield 43 becomes thick. As described above, the fourth shield 44 includes the third partial region 44c and the fourth partial region 44d. Thereby, the fourth shield 44 becomes thick. Electric resistance can be lowered by thickening the current path. Detection with high sensitivity becomes possible.

As shown in FIG. 1, a thickness of the third shield 43 along the first direction D1 is defined as a third shield thickness t43. A thickness of the fourth shield 44 along the first direction D1 is defined as a fourth shield thickness t44. A thickness of the first magnetic member 11 along the first direction D1 is defined as a first magnetic member thickness t11. The third shield thickness t43 is thicker than the first magnetic member thickness t11. The fourth shield thickness t44 is thicker than the first magnetic member thickness t11. Thereby, a high shield effect is obtained. For example, noise can be suppressed.

According to the embodiment, for example, detection with high sensitivity can be possible. For example, noise can be suppressed. According to the embodiment, it is possible to provide a magnetic head capable of improving performance. A magnetic sensor capable of improving performance can be provided.

In the embodiment, the third shield thickness t43 and the fourth shield thickness t44 are, for example, not less than 10 nm and not more than 100 nm. The first magnetic member thickness t11 is, for example, not less than 5 nm and not more than 30 nm. By the first magnetic member thickness being thin, it is possible to be adaptable to high recording density, for example.

As described above, the generated voltage changes according to the target magnetic field. This voltage change can be based, for example, on an Anomalous Hall Effect (AHE). For example, the first magnetic member 11 may have an anomalous Hall effect.

For example, the first magnetic member 11 may include at least one selected from the group consisting of CoMnGa, CoMnAl and FePt. In such materials, a large anomalous Hall effect can easily be obtained. For example, it is easy to obtain a large detection output. CoMnGa and CoMnAl are, for example, Heusler alloy materials.

In the embodiment, the first terminal 51 is electrically connected to the first magnetic member 11 via the first shield 41. The second terminal 52 is electrically connected to the first magnetic member 11 via the second shield 42. The third terminal 53 is electrically connected to the first magnetic member 11 via the third shield 43. The fourth terminal 54 is electrically connected to the first magnetic member 11 via the fourth shield 44.

As shown in FIG. 1, the magnetic head 110 (magnetic sensor 70A) may further include a conductive member 61. An electrical connection is established between the first magnetic member 11 and the shield through the conductive member 61.

For example, the conductive member 61 includes a first conductive region 61a, a second conductive region 61b, a third conductive region 61c and a fourth conductive region 61d. The first conductive region 61a is provided between at least a part of the first shield 41 and the first magnetic member 11. The second conductive region 61b is provided between the first magnetic member 11 and at least a part of the second shield 42. The third conductive region 61c is provided between the first partial region 43a and the first magnetic member 11. The fourth conductive region 61d is provided between the first magnetic member 11 and the third partial region 44c.

In this example, the first conductive region 61a, the second conductive region 61b, the third conductive region 61c, and the fourth conductive region 61d are continuous with each other. As will be described below, these conductive regions may be separated from each other.

As shown in FIG. 1, the magnetic head 110 (magnetic sensor 70A) may further include an insulating member 31. The insulating member 31 includes, for example, a first insulating region 31a, a second insulating region 31b, a third insulating region 31c and a fourth insulating region 31d. The first insulating region 31a is provided between the first shield 41 and the third shield 43. The second insulating region 31b is provided between the first shield 41 and the fourth shield 44. The third insulating region 31c is provided between the second shield 42 and the third shield 43. The fourth insulating region 31d is provided between the second shield 42 and the fourth shield 44.

As shown in FIG. 1, the third shield 43 is located between the first shield 41 and the second shield 42 in the first direction D1. The fourth shield 44 is located between the first shield 41 and the second shield 42 in the first direction D1.

As shown in FIG. 1, the magnetization 43M of the third shield 43 may be along the magnetization 44M of the fourth shield 44. These magnetizations may be in the same direction. As will be described later, a magnetic layer for controlling magnetization may be provided.

As shown in FIG. 1, the first shield 41 includes a first shield side face 41s. The first shield side face 41s faces the third shield 43 in the second direction D2. The first shield side face 41s may be inclined with respect to the first direction D1. Another side face 41r of the first shield 41 (side face facing the fourth shield 44) may be inclined with respect to the first direction D1. In this example, these side faces are curved.

As shown in FIG. 1, the magnetic head 110 may be included in a magnetic recording device 210. The magnetic recording device 210 includes a first circuit 75a and a second circuit 75b. The first circuit 75a is configured to supply a current i1 between the third terminal 53 and the fourth terminal 54. The second circuit 75b is configured to detect a voltage V1 between the first terminal 51 and the second terminal 52.

As described below, the magnetic recording device 210 may further include a magnetic recording medium. The voltage V1 changes according to information recorded on the magnetic recording medium.

Figure 2:
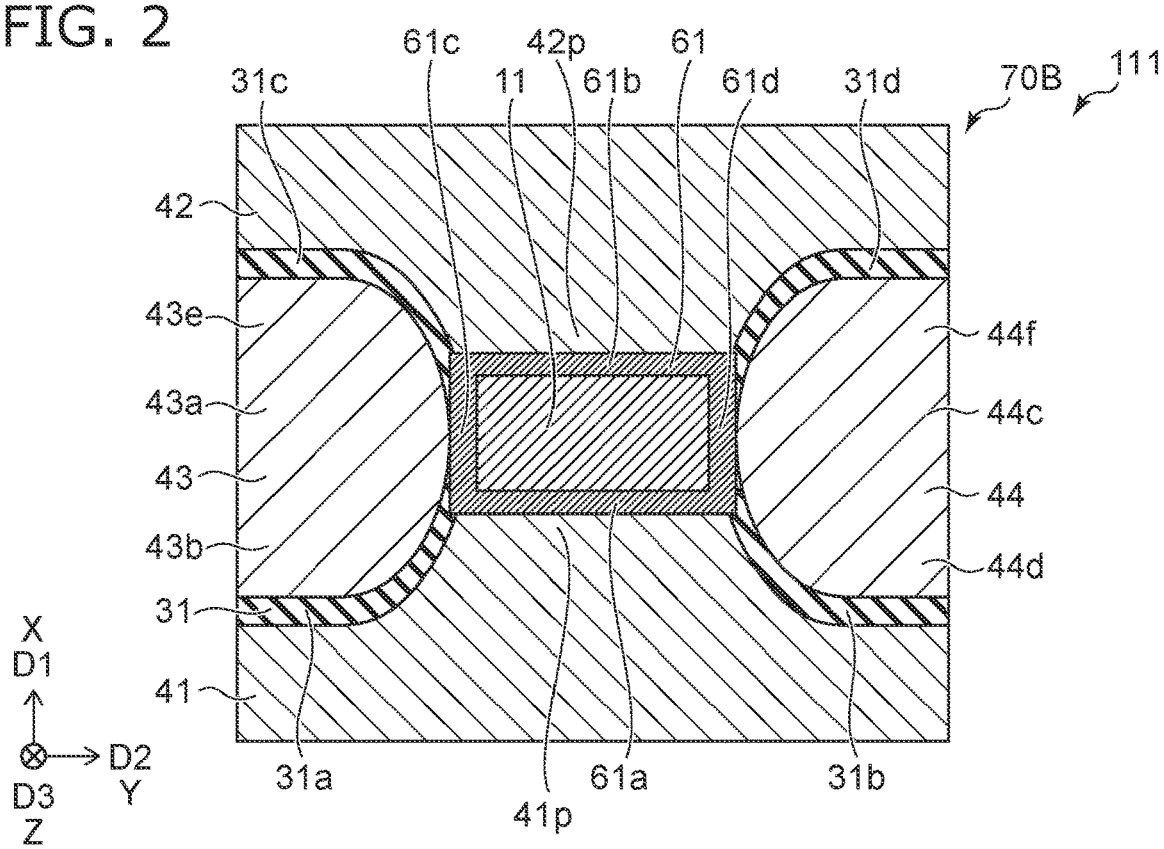
FIG. 2 is a schematic cross-sectional view illustrating the magnetic head according to the first embodiment.

FIG. 2 is a schematic cross-sectional view illustrating the magnetic head according to the first embodiment.

As shown in FIG. 2, in a magnetic head 111 (magnetic sensor 70B) according to the embodiment, the third shield 43 further includes a fifth partial region 43e, and the fourth shield 44 further includes a sixth partial region 44f. Except for this, the configuration of the magnetic head 111 may be the same as the configuration of the magnetic head 110. In FIG. 2, the terminals are omitted.

As shown in FIG. 2, in the magnetic head 111, the first partial region 43a is located between the second partial region 43b and the fifth partial region 43e in the first direction D1. The third partial region 44c is located between the fourth partial region 44d and the sixth partial region 44f in the first direction. The portion 42p of the second shield 42 is located between the fifth partial region 43e and the sixth partial region 44f in the second direction D2.

By such a configuration, the third shield 43 and the fourth shield 44 becomes thicker. A lower electrical resistance is obtained. Higher shielding performance is obtained. Better performance can be obtained.

Figure 3:
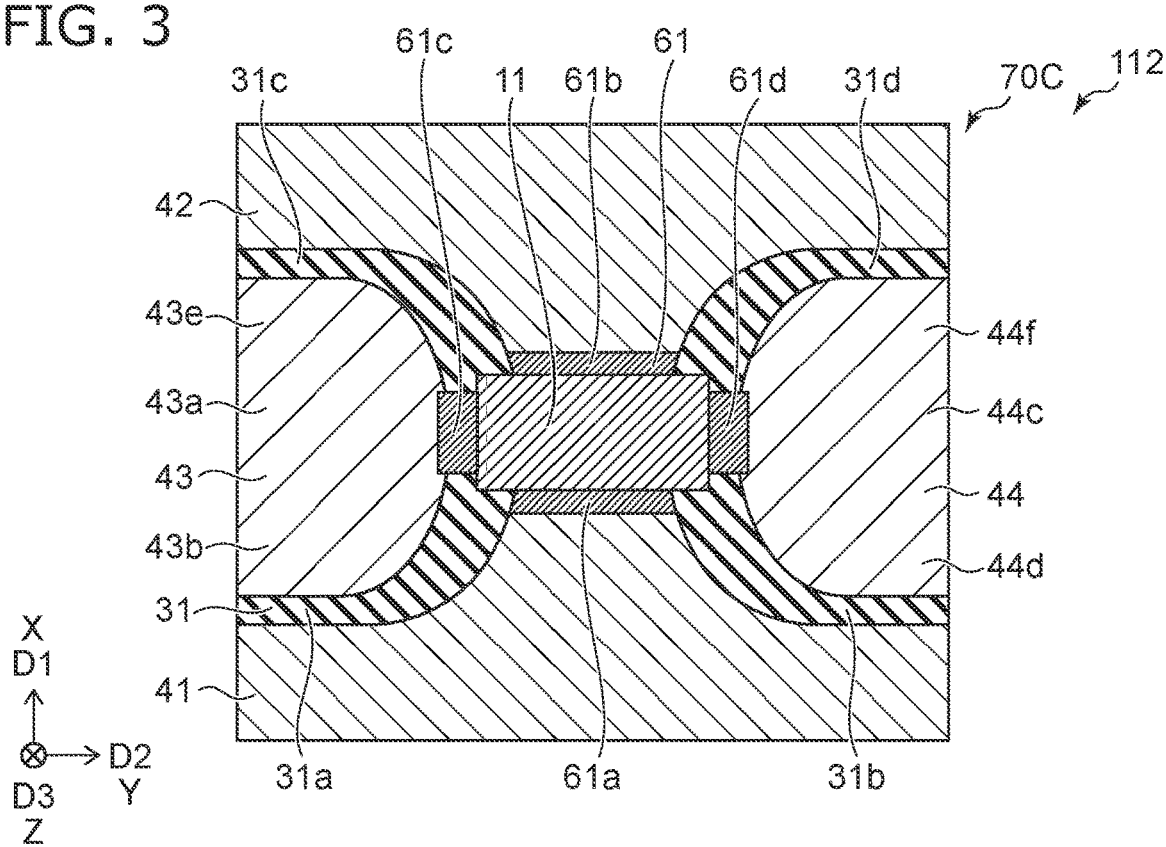
FIG. 3 is a schematic cross-sectional view illustrating the magnetic head according to the first embodiment.

FIG. 3 is a schematic cross-sectional view illustrating the magnetic head according to the first embodiment.

As shown in FIG. 3, in a magnetic head 112 (magnetic sensor 70C) according to the embodiment, the conductive member 61 is divided. Except for this, the configuration of the magnetic head 112 may be the same as the configuration of the magnetic head 111. In FIG. 3, the terminals are omitted.

As shown in FIG. 3, a portion of the first insulating region 31a is provided between the first conductive region 61a and the third conductive region 61c. A portion of the second insulating region 31b is provided between the first conductive region 61a and the fourth conductive region 61d. A portion of the third insulating region 31c is provided between the second conductive region 61b and the third conductive region 61c. A portion of the fourth insulating region 31d is provided between the second conductive region 61b and the fourth conductive region 61d.

For example, the third conductive region 61c is separated from the first conductive region 61a and the second conductive region 61b. The fourth conductive region 61d is separated from the first conductive region 61a and the second conductive region 61b.

In such a configuration, the current i1 flows through the first magnetic member 11 efficiently. For example, shunt current is suppressed. For example, higher sensitivity is obtained.

Figure 4:
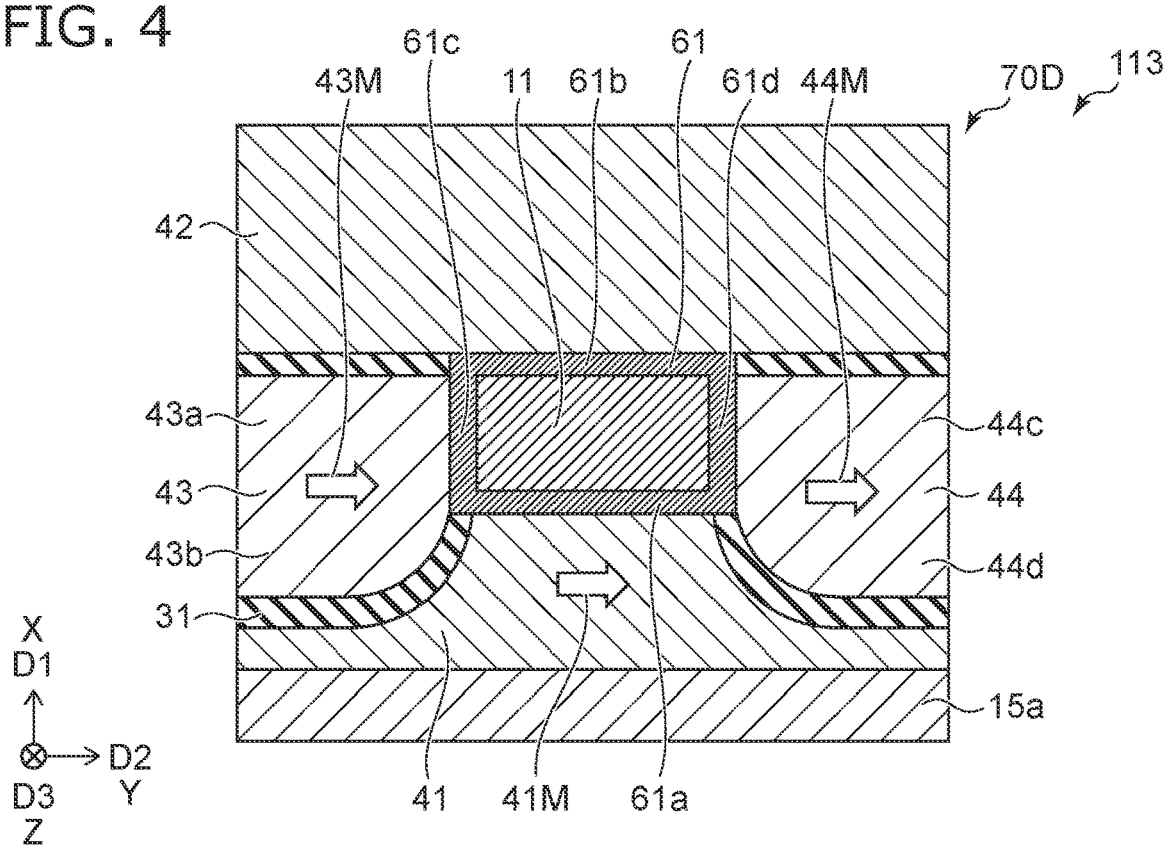
FIG. 4 is a schematic cross-sectional view illustrating the magnetic head according to the first embodiment.

FIG. 4 is a schematic cross-sectional view illustrating the magnetic head according to the first embodiment.

As shown in FIG. 4, a magnetic head 113 (magnetic sensor 70D) according to the embodiment further includes a first magnetic layer 15a. Except for this, the configuration of the magnetic head 113 may be the same as the configuration of the magnetic head 110, for example. In FIG. 4, the terminals are omitted.

In the magnetic head 113, the first magnetic layer 15a includes, for example, at least one selected from the group consisting of IrMn, PtMn, FeMn and NiMn. The first magnetic layer 15a is, for example, an antiferromagnetic layer. The first shield 41 is provided between the first magnetic layer 15a and the third shield 43, between the first magnetic layer 15a and the first magnetic member 11, and between the first magnetic layer 15a and the fourth shield 44 in the first direction D1.

For example, the magnetization 43M of the third shield 43 and the magnetization 44M of the fourth shield 44 are controlled in the desired direction by the first magnetic layer 15a. The magnetization 41M of the first shield 41 is controlled by the first magnetic layer 15a. The first magnetic layer 15a is provided outside the first shield 41. Thus, the thicknesses of the third shield 43 and the fourth shield 44 can be maintained. Low electrical resistance is obtained. High shield performance is obtained.

Figure 5:
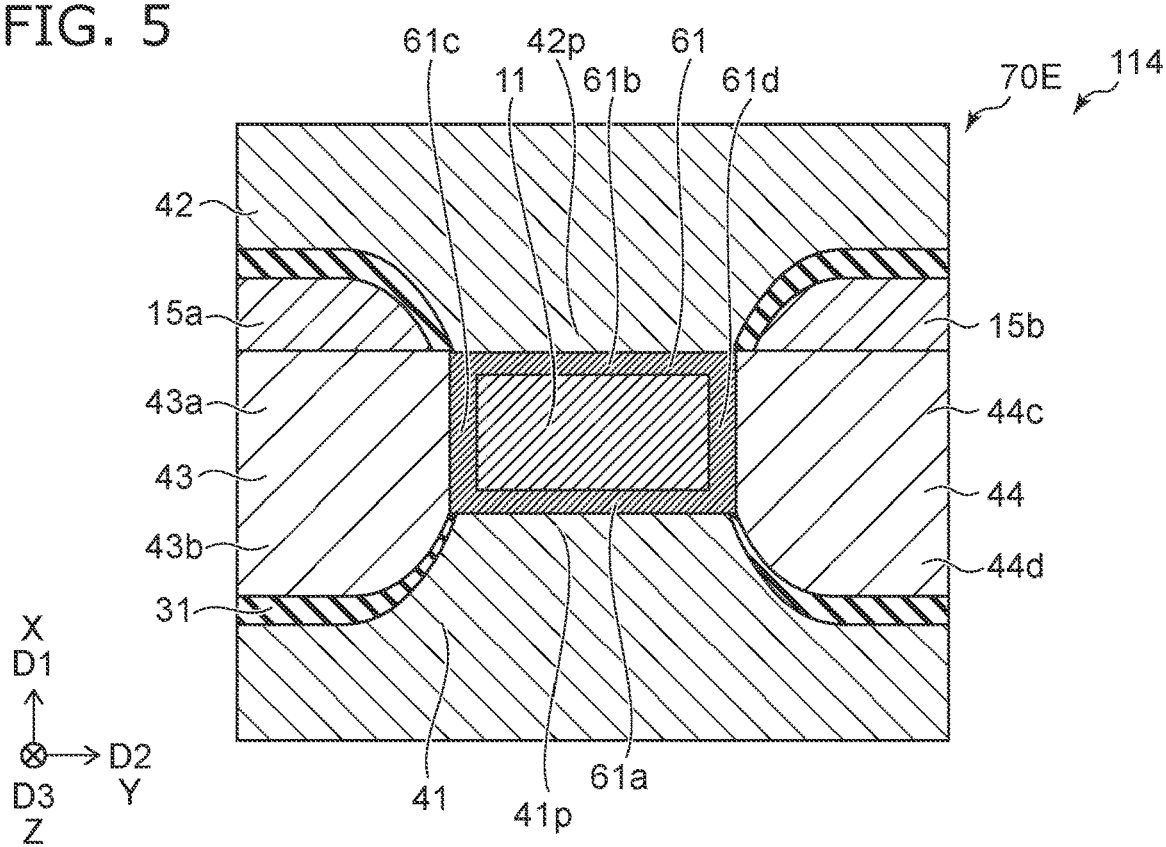
FIG. 5 is a schematic cross-sectional view illustrating the magnetic head according to the first embodiment.

FIG. 5 is a schematic cross-sectional view illustrating the magnetic head according to the first embodiment.

As shown in FIG. 5, a magnetic head 114 (magnetic sensor 70E) according to the embodiment further includes a first magnetic layer 15a and a second magnetic layer 15b. Except for this, the configuration of the magnetic head 114 may be the same as the configuration of the magnetic head 110, for example. In FIG. 5, the terminals are omitted.

The first magnetic layer 15a and the second magnetic layer 15b include at least one selected from the group consisting of IrMn, PtMn, FeMn and NiMn. These magnetic layers are, for example, antiferromagnetic layers.

The first magnetic layer 15a is provided between the third shield 43 and the second shield 42 in the first direction D1. The second magnetic layer 15b is provided between the fourth shield 44 and the second shield 42 in the first direction D1. The portion 42p of the second shield 42 is provided between the first magnetic layer 15a and the second magnetic layer 15b in the second direction D2. By these magnetic layer, the third shield 43 and the fourth shield 44 are appropriately controlled.

Also in the magnetic head 114, the third shield 43 and the fourth shield 44 can be thick. Low electrical resistance is obtained. High shield performance is obtained.

Figure 6:
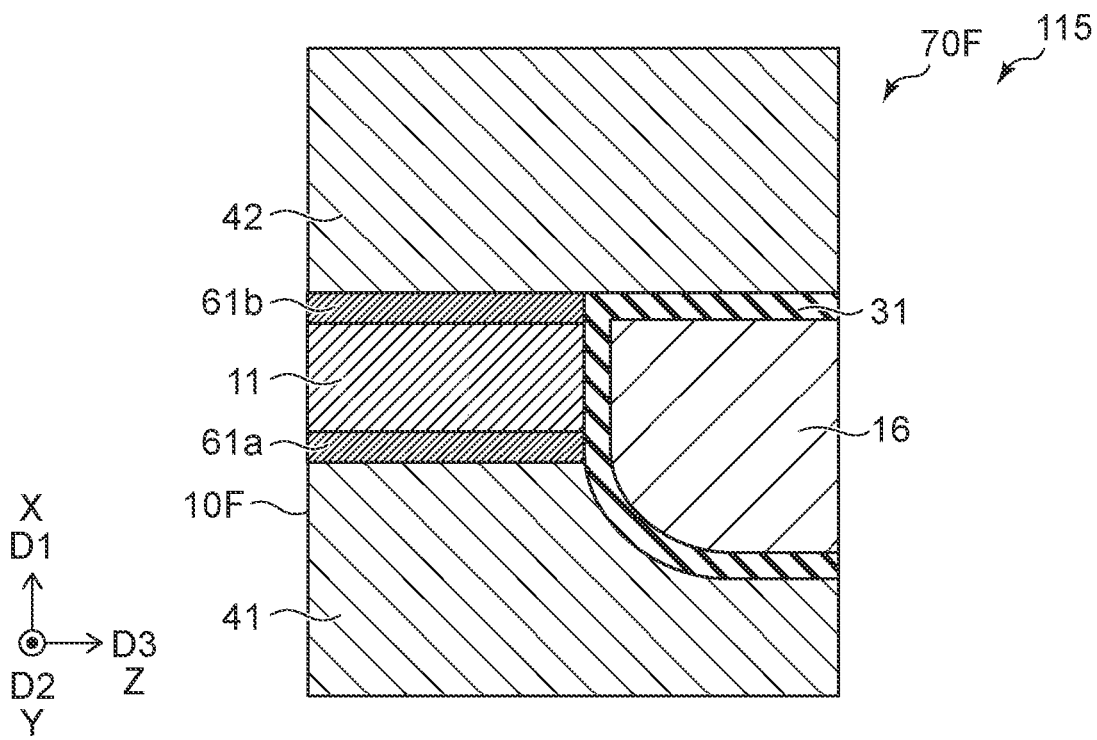
FIG. 6 is a schematic cross-sectional view illustrating the magnetic head according to the first embodiment.

FIG. 6 is a schematic cross-sectional view illustrating the magnetic head according to the first embodiment.

As shown in FIG. 6, a magnetic head 115 (magnetic sensor 70F) according to the embodiment further includes a first magnetic portion 16. Except for this, the configuration of the magnetic head 115 may be the same as the configuration of the magnetic head 110, for example. In FIG. 6, the terminals are omitted.

As shown in FIG. 6, a third direction D3 from the first magnetic member 11 to the first magnetic portion 16 crosses a plane including the first direction D1 and the second direction D2. The third direction D3 is, for example, the Z-axis direction. As shown in FIG. 6, the magnetic head 115 includes a medium facing surface 10F. The first magnetic member 11 is provided between the medium facing surface 10F and the first magnetic portion 16.

The first magnetic portion 16 is, for example, a hard bias layer. The magnetization of other members can be controlled by the first magnetic portion 16. Stable characteristics can be easily obtained.

Figure 7:
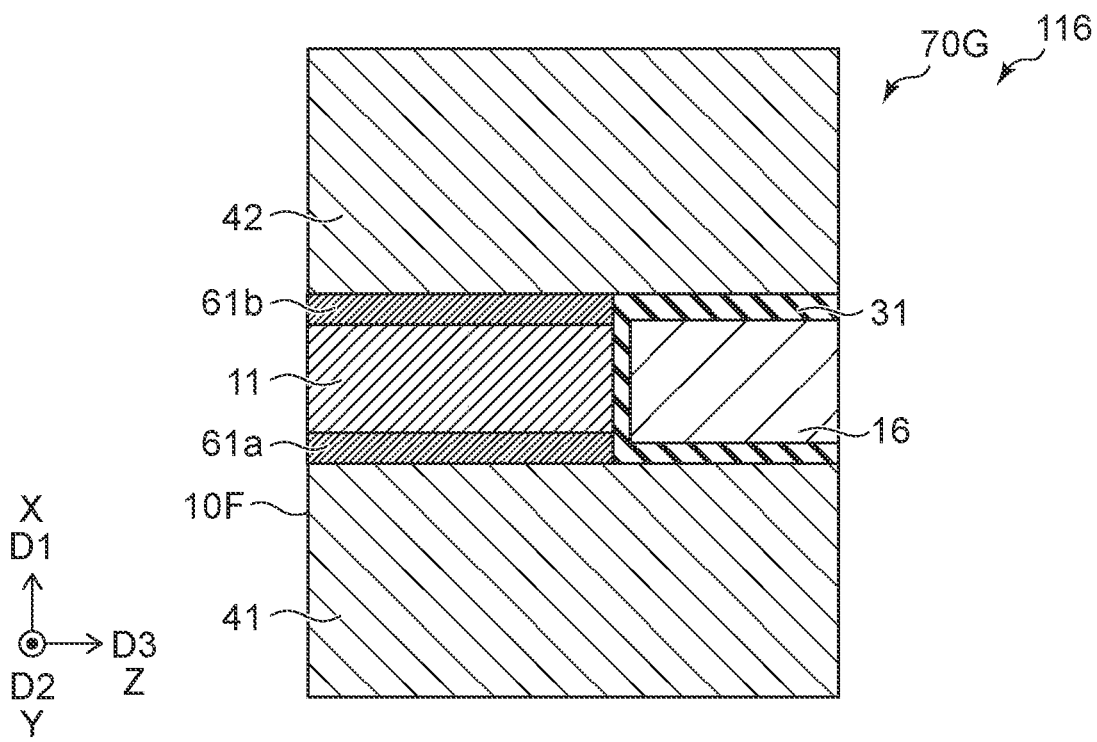
FIG. 7 is a schematic cross-sectional view illustrating the magnetic head according to the first embodiment.

FIG. 7 is a schematic cross-sectional view illustrating the magnetic head according to the first embodiment.

As shown in FIG. 7, a magnetic head 116 (magnetic sensor 70G) according to the embodiment also further includes the first magnetic portion 16. Except for this, the configuration of the magnetic head 116 may be the same as the configuration of the magnetic head 110, for example. In FIG. 7, the terminals are omitted. For example, the first magnetic portion 16 may not overlap the first shield 41 in the third direction D3. The first magnetic portion 16 may not to overlap the second shield 42 in the third direction D3.

Figure 8:
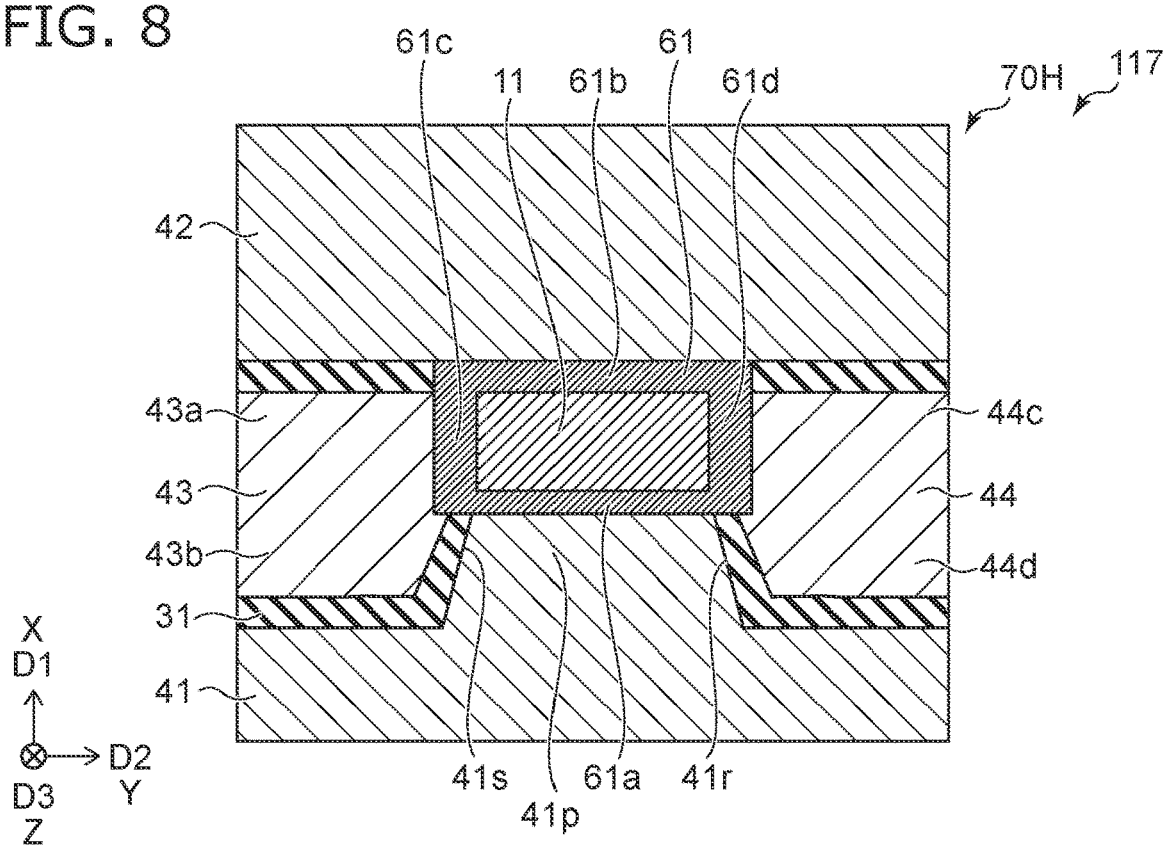
FIG. 8 is a schematic cross-sectional view illustrating a magnetic head according to the first embodiment.

FIG. 8 is a schematic cross-sectional view illustrating a magnetic head according to the first embodiment.

As shown in FIG. 8, in a magnetic head 117 (magnetic sensor 70H) according to the embodiment, the first shield side face 41s and the side face 41r of the first shield 41 are linear (planar). Except for this, the configuration of the magnetic head 117 may be the same as the configuration of the magnetic head 110, for example. In FIG. 8, terminals are omitted. In the magnetic head 117, the first shield side face 41s and the side face 41r are inclined with respect to the first direction D1.

Figure 9:
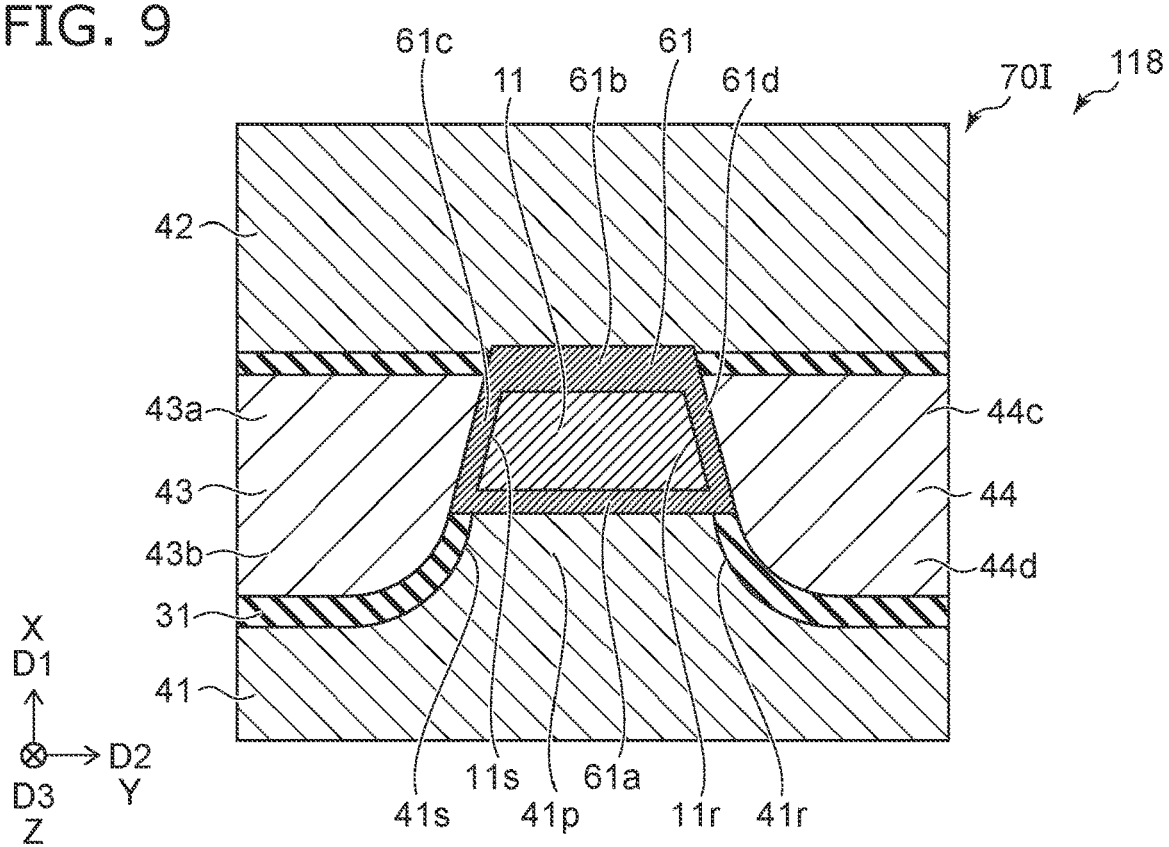
FIG. 9 is a schematic cross-sectional view illustrating the magnetic head according to the first embodiment.

FIG. 9 is a schematic cross-sectional view illustrating the magnetic head according to the first embodiment.

As shown in FIG. 9, in a magnetic head 118 (magnetic sensor 70I) according to the embodiment, the side face of the first magnetic member 11 is inclined with respect to the first direction D1. Except for this, the configuration of the magnetic head 118 may be the same as the configuration of the magnetic head 110, for example. In FIG. 9, terminals are omitted.

As shown in FIG. 9, the first magnetic member 11 includes a first magnetic member side face 11s. The first magnetic member side face 11s faces the first partial region 43a in the second direction D2. The first magnetic member side face 11s is inclined with respect to the first direction D1. Another side face 11r (side face facing the third partial region 44c) of the first magnetic member 11 may be inclined with respect to the first direction D1.

Figure 10:
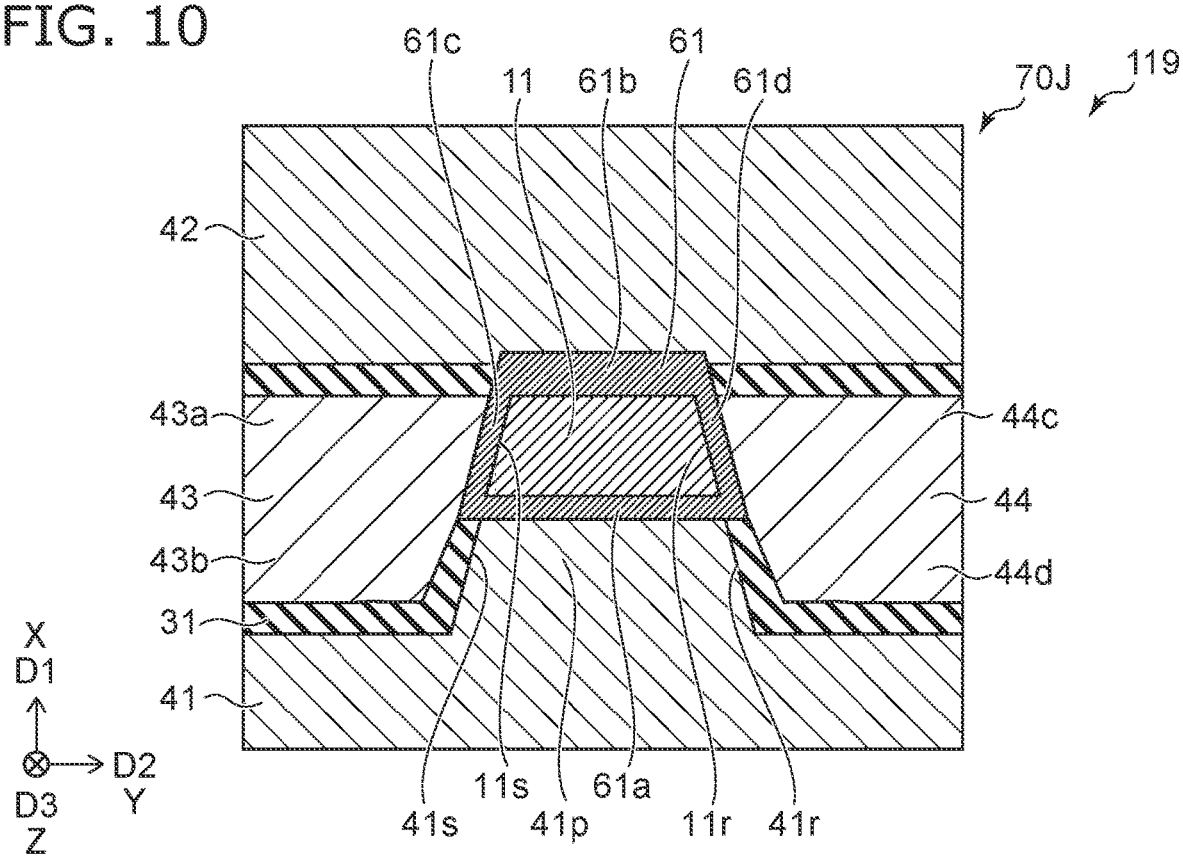
FIG. 10 is a schematic cross-sectional view illustrating the magnetic head according to the first embodiment.

FIG. 10 is a schematic cross-sectional view illustrating the magnetic head according to the first embodiment.

As shown in FIG. 10, in a magnetic head 119 (magnetic sensor 70J) according to the embodiment, the side face of the first shield 41 and the side face of the first magnetic member 11 are inclined with respect to the first direction D1. Except for this, the configuration of the magnetic head 119 may be the same as the configuration of the magnetic head 110, for example. In FIG. 9, terminals are omitted.

Second Embodiment

Figure 11:
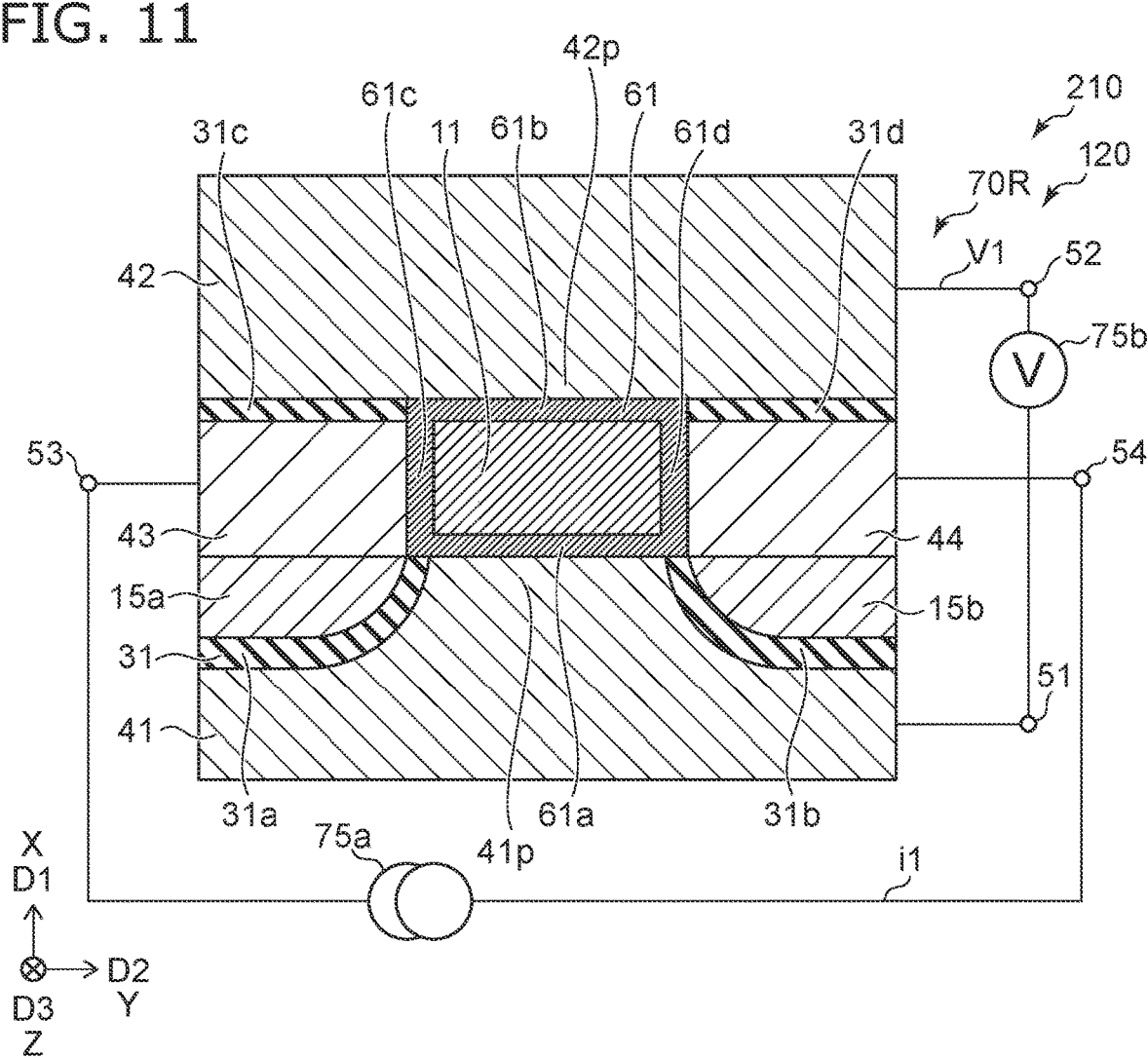
FIG. 11 is a schematic cross-sectional view illustrating a magnetic head according to the second embodiment.

FIG. 11 is a schematic cross-sectional view illustrating a magnetic head according to the second embodiment.

As shown in FIG. 11, a magnetic head 120 (magnetic sensor 70R) according to the embodiment includes the first shield 41, the second shield 42, the third shield 43, the fourth shield 44, the first terminal 51, the second terminal 52, the third terminal 53, the first magnetic member 11, the first magnetic layer 15a and the second magnetic layer 15b.

The first terminal 51 is electrically connected to the first shield 41. The second terminal 52 is electrically connected to the second shield 42. The third terminal 53 is electrically connected to the third shield 43. The fourth terminal 54 is electrically connected to the fourth shield 44.

In the first direction D1 from the first shield 41 to the second shield 42, the first magnetic member 11 is located between the portion 41p of the first shield 41 and the portion 42p of the second shield 42. The first magnetic member 11 is provided between the third shield 43 and the fourth shield 44 in the second direction D2 crossing the first direction D1. The portion 41p of the first shield 41 is provided between the first magnetic layer 15a and the second magnetic layer 15b in the second direction D2. The first magnetic layer 15a and the second magnetic layer 15b include at least one selected from the group consisting of IrMn, PtMn, FeMn and NiMn.

In the magnetic head 120, a portion including the third shield 43 and the first magnetic layer 15a forms a part of the current path. A portion including the fourth shield 44 and the second magnetic layer 15b forms a part of the current path. These current paths are thick. Low electrical resistance is obtained. For example, the detection target magnetic field can be detected with high efficiency. Noise can be suppressed.

Third Embodiment

Figure 12:
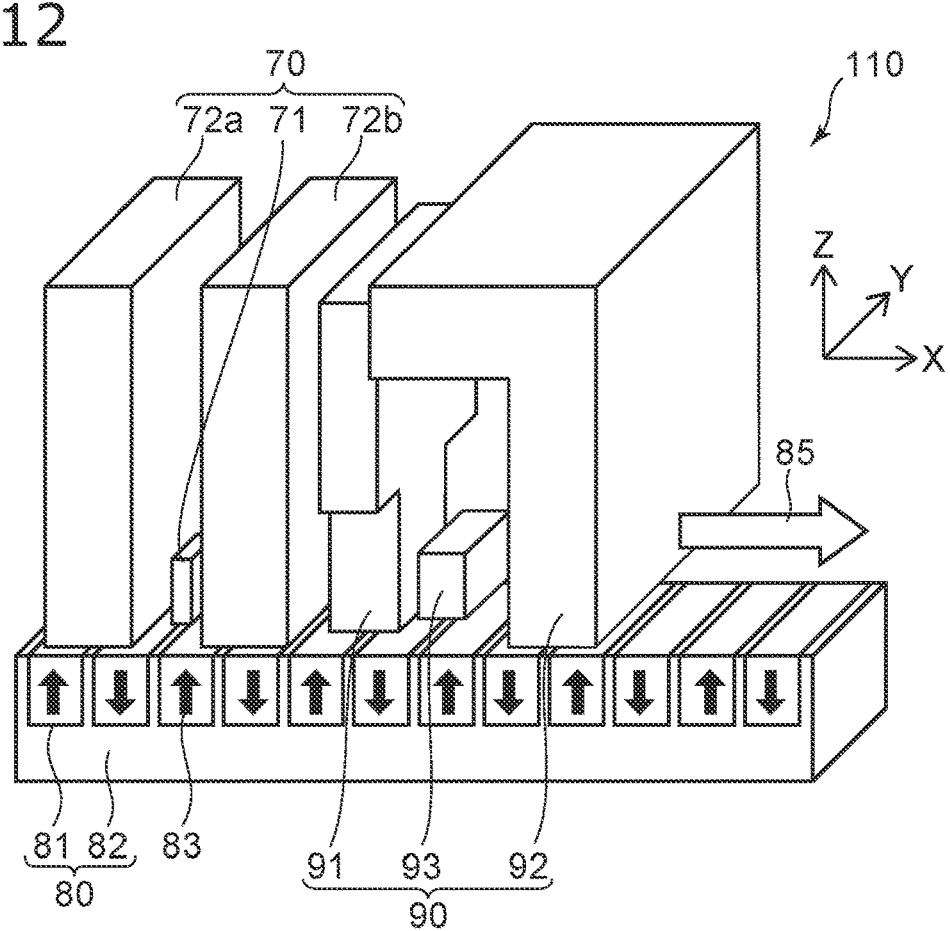
FIG. 12 is a schematic perspective view illustrating the magnetic head and a magnetic recording device according to the third embodiment.

FIG. 12 is a schematic perspective view illustrating the magnetic head and a magnetic recording device according to the third embodiment.

As shown in FIG. 12, the magnetic head 110 according to the embodiment includes a reproducing section 70. The reproducing section 70 includes the magnetic sensor (magnetic sensor 70A or magnetic sensor 70B) according to the first embodiment. The magnetic head 110 is used with a magnetic recording medium 80. In this example, the magnetic head 110 includes a recording section 90. Information is recorded on the magnetic recording medium 80 by the recording section 90 of the magnetic head 110. Information recorded on the magnetic recording medium 80 is reproduced by the reproducing section 70.

The magnetic recording medium 80 includes, for example, a medium substrate 82 and a magnetic recording layer 81 provided on the medium substrate 82. The magnetization 83 of the magnetic recording layer 81 is controlled by the recording section 90. The recording section 90 includes, for example, a first magnetic pole 91 and a second magnetic pole 92. The first magnetic pole 91 is, for example, the major magnetic pole. The second magnetic pole 92 is, for example, a trailing shield. The recording section 90 may include a recording section element 93. The recording section element 93 may include a magnetic field control element, a high frequency oscillation element, or the like. The recording section element 93 may be omitted.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 can output a signal corresponding to the magnetization 83 of the magnetic recording layer 81.

The first reproducing magnetic shield 72a corresponds to, for example, the first shield 41 (see FIG. 1). The second reproducing magnetic shield 72b corresponds to, for example, the second shield 42 (see FIG. 1). The magnetic reproducing element 71 includes the first magnetic member 11. In FIG. 12, the third shield 43 and the fourth shield 44 are omitted.

As shown in FIG. 12, the magnetic recording medium 80 moves relative to the magnetic head 110 in a medium movement direction 85. Information corresponding to the magnetization 83 of the magnetic recording layer 81 is controlled at an arbitrary position by the magnetic head 110. Information corresponding to the magnetization 83 of the magnetic recording layer 81 is reproduced at an arbitrary position by the magnetic head 110.

Figure 13:
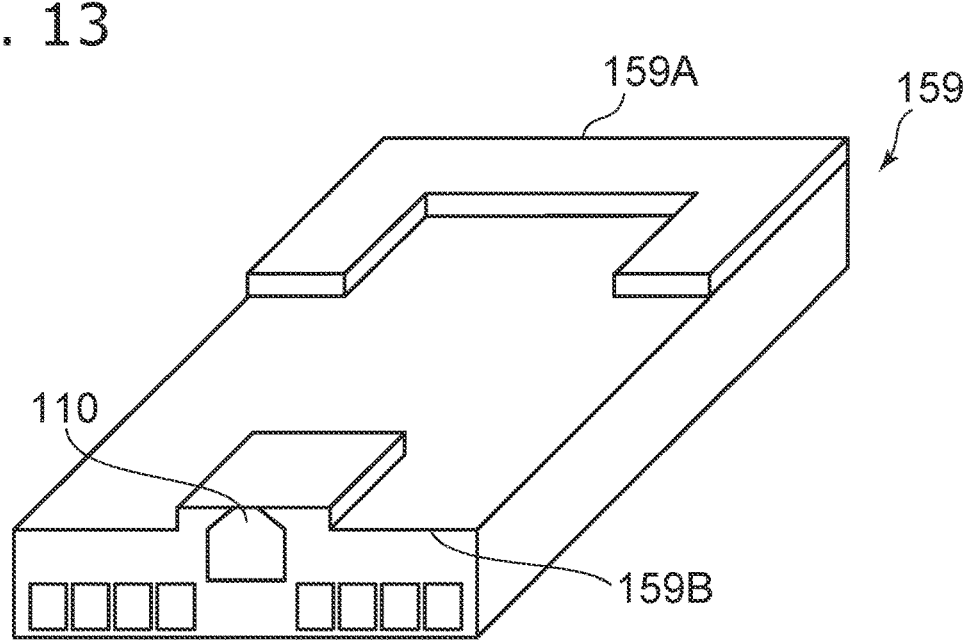
FIG. 13 is a schematic perspective view illustrating a part of the magnetic recording device according to the embodiment.

FIG. 13 is a schematic perspective view illustrating a part of the magnetic recording device according to the embodiment.

FIG. 13 illustrates a head slider.

The magnetic head 110 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 14:
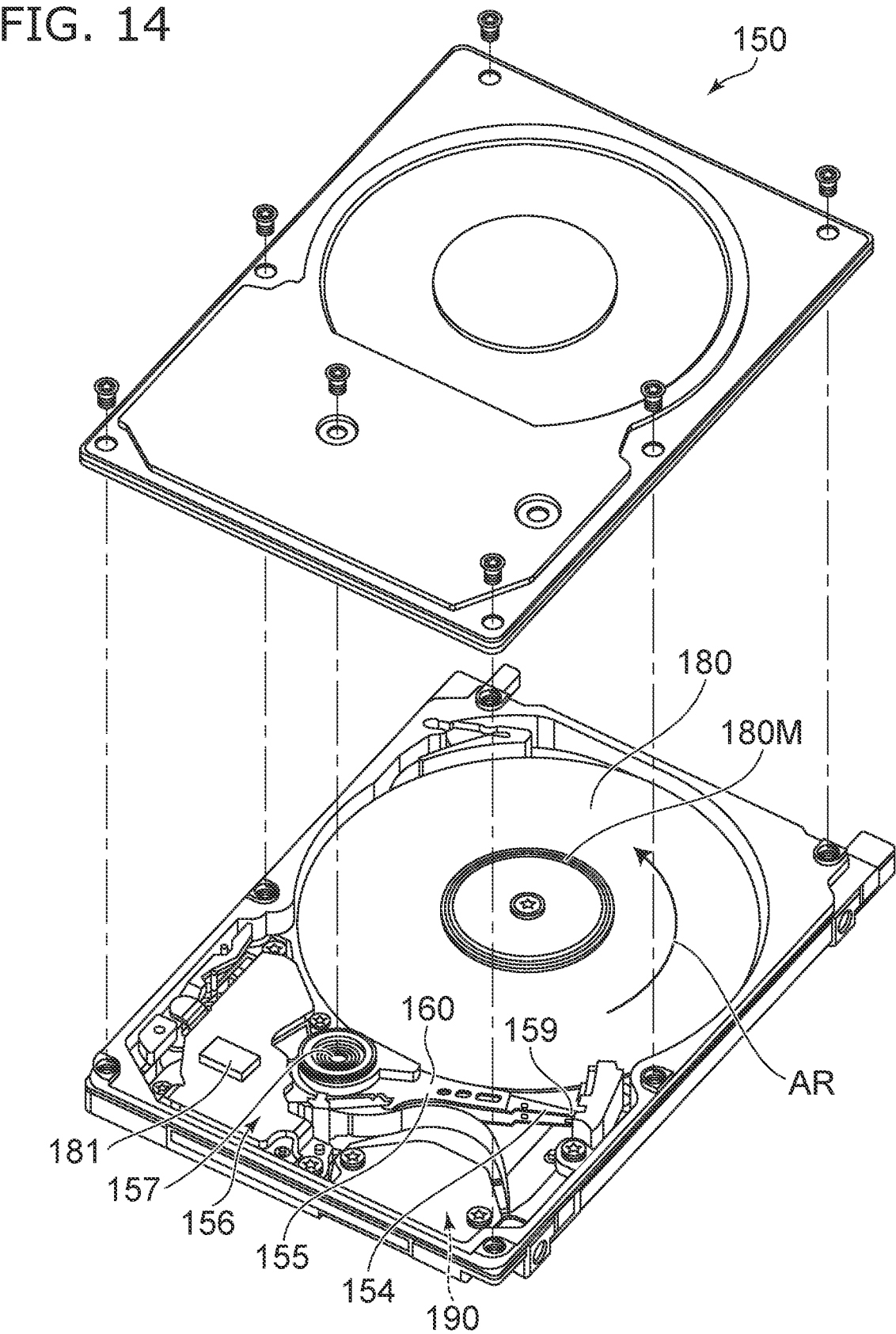
FIG. 14 is a schematic perspective view illustrating the magnetic recording device according to the embodiment.

FIG. 14 is a schematic perspective view illustrating the magnetic recording device according to the embodiment.

Figure 15A:
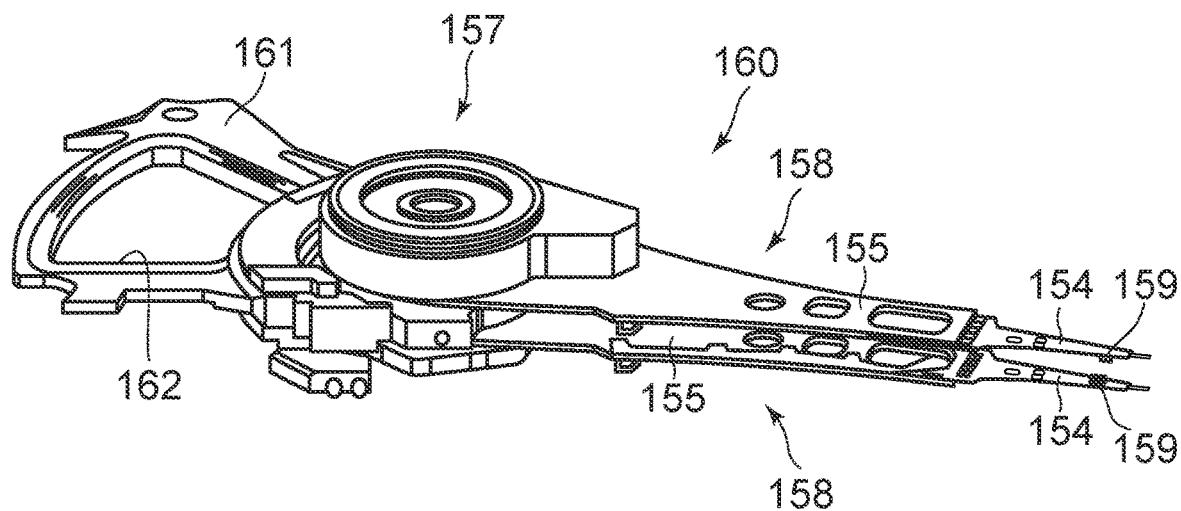
FIGS. 15A and 15B are schematic perspective views illustrating a part of the magnetic recording device according to the embodiment.
Figure 15B:
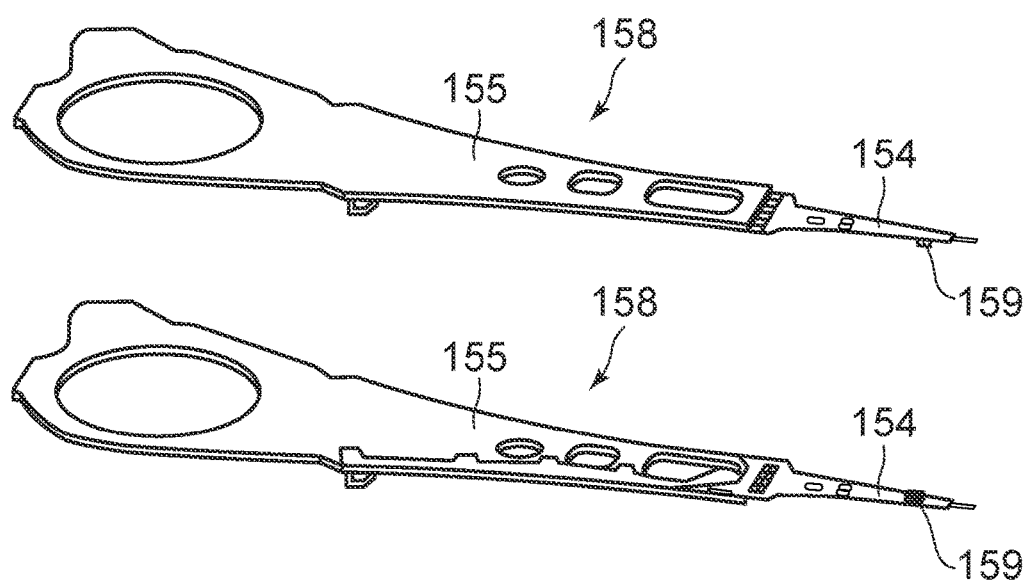

FIGS. 15A and 15B are schematic perspective views illustrating a part of the magnetic recording device according to the embodiment.

As shown in FIG. 14, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 15A is an enlarged perspective view of the head stack assembly 160, illustrating the configuration of a part of the magnetic recording device.

FIG. 15B is a perspective view illustrating the magnetic head assembly (head gimbal assembly: HGA) 158 that forms part of the head stack assembly 160.

As shown in FIG. 15A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 15B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1

A magnetic head, comprising:
a first shield;
a second shield;
a third shield including a first partial region and a second partial region;
a fourth shield including a third partial region and a fourth partial region;
a first terminal electrically connected to the first shield;
a second terminal electrically connected to the second shield;
a third terminal electrically connected to the third shield;
a fourth terminal electrically connected to the fourth shield; and
a first magnetic member,
the first magnetic member being provided between a portion of the first shield and a portion of the second shield in a first direction from the first shield to the second shield, the first magnetic member being provided between the first partial region and the third partial region in a second direction crossing the first direction, the portion of the first shield being provided between the second partial region and the fourth partial region in the second direction.

Configuration 2

The magnetic head according to Configuration 1, wherein a voltage between the first terminal and the second terminal changes depending on a target magnetic field when a current is supplied between the third terminal and the fourth terminal.

Configuration 3

The magnetic head according to Configuration 2, wherein
the first terminal is electrically connected to the first magnetic member via the first shield,
the second terminal is electrically connected to the first magnetic member via the second shield,
the third terminal is electrically connected to the first magnetic member via the third shield, and
the fourth terminal is electrically connected to the first magnetic member via the fourth shield.

Configuration 4

The magnetic head according to any one of Configurations 1-3, further comprising:
a conductive member,
the conductive member including a first conductive region, a second conductive region, a third conductive region and a fourth conductive region,
the first conductive region being provided between at least a part of the first shield and the first magnetic member,
the second conductive region being provided between the first magnetic member and at least a part of the second shield,
the third conductive region being provided between the first partial region and the first magnetic member, and
the fourth conductive region being provided between the first magnetic member and the third partial region.

Configuration 5

The magnetic head according to Configuration 4, further comprising:
an insulating member,
the insulating member including a first insulating region, a second insulating region, a third insulating region, and a fourth insulating region,
the first insulating region being provided between the first shield and the third shield,
the second insulating region being provided between the first shield and the fourth shield,
the third insulating region being provided between the second shield and the third shield, and
the fourth insulating region being provided between the second shield and the fourth shield.

Configuration 6

The magnetic head according to Configuration 5, wherein
a part of the first insulating region is provided between the first conductive region and the third conductive region,
a part of the second insulating region is provided between the first conductive region and the fourth conductive region,
a part of the third insulating region is provided between the second conductive region and the third conductive region, and
a part of the fourth insulating region is provided between the second conductive region and the fourth conductive region.

Configuration 7

The magnetic head according to Configuration 6, wherein
the third conductive region is separated from the first conductive region and the second conductive region, and
the fourth conductive region is separated from the first conductive region and the second conductive region.

Configuration 8

The magnetic head according to any one of Configurations 1-7, wherein
the third shield is located between the first shield and the second shield in the first direction, and
the fourth shield is located between the first shield and the second shield in the first direction.

Configuration 9

The magnetic head according to any one of Configurations 1-8, wherein
the third shield further includes a fifth partial region,
the first partial region is located between the second partial region and the fifth partial region in the first direction,
the fourth shield further includes a sixth partial region,
the third partial region is located between the fourth partial region and the sixth partial region in the first direction, and
the portion of the second shield is located between the fifth partial region and the sixth partial region in the second direction.

Configuration 10

The magnetic head according to any one of Configurations 1-9, further comprising:
a first magnetic layer,
the first magnetic layer including at least one selected from the group consisting of IrMn, PtMn, FeMn and NiMn, and
the first shield being provided between the first magnetic layer and the third shield, between the first magnetic layer and the first magnetic member, and between the first magnetic layer and the fourth shield in the first direction.

Configuration 11

The magnetic head according to Configuration 1, further comprising:
a first magnetic layer; and
a second magnetic layer,
the first magnetic layer and the second magnetic layer including at least one selected from the group consisting of IrMn, PtMn, FeMn and NiMn,
the first magnetic layer being provided between the third shield and the second shield in the first direction,
a second magnetic layer being provided between the fourth shield and the second shield in the first direction, and
the portion of the second shield being provided between the first magnetic layer and the second magnetic layer in the second direction.

Configuration 12

The magnetic head according to any one of Configurations 1-11, further comprising:
a first magnetic portion,
a third direction from the first magnetic member to the first magnetic portion crossing a plane including the first direction and the second direction Configuration 13
The magnetic head according to any one of Configurations 1-12, wherein
the first shield includes a first shield side face facing the third shield in the second direction,
the first shield side face is inclined with respect to the first direction.

Configuration 14
The magnetic head according to any one of Configurations 1-13, wherein
the first magnetic member includes a first magnetic member side face facing the first partial region in the second direction, and
the first magnetic member side face is inclined with respect to the first direction.

Configuration 15
The magnetic head according to any one of Configurations 1-14, wherein
the first magnetic member includes at least one selected from the group consisting of CoMnGa, CoMnAl and FePt.

Configuration 16
The magnetic head according to any one of Configurations 1-15, wherein
a third shield thickness along the first direction of the third shield is thicker than a first magnetic member thickness along the first direction of the first magnetic member.

Configuration 17
The magnetic head according to Configuration 16, wherein
the third shield thickness is not less than 10 nm and not more than 100 nm.

Configuration 18
A magnetic head, comprising:
a first shield;
a second shield;
a third shield;
a fourth shield;
a first terminal electrically connected to the first shield;
a second terminal electrically connected to the second shield;
a third terminal electrically connected to the third shield;
a fourth terminal electrically connected to the fourth shield;
a first magnetic member;
a first magnetic layer; and
a second magnetic layer;
in a first direction from the first shield to the second shield, the first magnetic member being located between a portion of the first shield and a portion of the second shield, and
in a second direction crossing the first direction, the first magnetic member being located between the third shield and the fourth shield, and
the portion of the first shield being provided between the first magnetic layer and the second magnetic layer in the second direction, and
the first magnetic layer and the second magnetic layer including at least one selected from the group consisting of IrMn, PtMn, FeMn and NiMn.

Configuration 19
A magnetic recording device, comprising:
the magnetic head according to Configuration 1 or 18;
a first circuit; and
a second circuit,
the first circuit being configured to supply a current between the third terminal and the fourth terminal, and
the second circuit being configured to detect a voltage between the first terminal and the second terminal.

Configuration 20
The magnetic recording device according to Configuration 19, further comprising:
a magnetic recording medium,
the voltage being configured to change according to information recorded on the magnetic recording medium.

According to the embodiments, it is possible to provide a magnetic head and a magnetic recording device capable of improving performance.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as shields, magnetic members, magnetic layers, conductive members, insulating members and terminals, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A magnetic head, comprising:
a first shield;
a second shield;
a third shield including a first partial region and a second partial region;
a fourth shield including a third partial region and a fourth partial region;
a first terminal electrically connected to the first shield;
a second terminal electrically connected to the second shield;
a third terminal electrically connected to the third shield;

a fourth terminal electrically connected to the fourth shield; and a first magnetic member, the first magnetic member being provided between a portion of the first shield and a portion of the second shield in a first direction from the first shield to the second shield, the first magnetic member being provided between the first partial region and the third partial region in a second direction crossing the first direction, the portion of the first shield being provided between the second partial region and the fourth partial region in the second direction.

2. The magnetic head according to claim 1, wherein a voltage between the first terminal and the second terminal changes depending on a target magnetic field when a current is supplied between the third terminal and the fourth terminal.

3. The magnetic head according to claim 2, wherein the first terminal is electrically connected to the first magnetic member via the first shield, the second terminal is electrically connected to the first magnetic member via the second shield, the third terminal is electrically connected to the first magnetic member via the third shield, and the fourth terminal is electrically connected to the first magnetic member via the fourth shield.

4. The magnetic head according to claim 1, further comprising:

a conductive member, the conductive member including a first conductive region, a second conductive region, a third conductive region and a fourth conductive region, the first conductive region being provided between at least a part of the first shield and the first magnetic member, the second conductive region being provided between the first magnetic member and at least a part of the second shield, the third conductive region being provided between the first partial region and the first magnetic member, and the fourth conductive region being provided between the first magnetic member and the third partial region.

5. The magnetic head according to claim 4, further comprising:

an insulating member, the insulating member including a first insulating region, a second insulating region, a third insulating region, and a fourth insulating region, the first insulating region being provided between the first shield and the third shield, the second insulating region being provided between the first shield and the fourth shield, the third insulating region being provided between the second shield and the third shield, and the fourth insulating region being provided between the second shield and the fourth shield.

6. The magnetic head according to claim 5, wherein a part of the first insulating region is provided between the first conductive region and the third conductive region, a part of the second insulating region is provided between the first conductive region and the fourth conductive region, a part of the third insulating region is provided between the second conductive region and the third conductive region, and a part of the fourth insulating region is provided between the second conductive region and the fourth conductive region.

7. The magnetic head according to claim 6, wherein the third conductive region is separated from the first conductive region and the second conductive region, and the fourth conductive region is separated from the first conductive region and the second conductive region.

8. The magnetic head according to claim 1, wherein the third shield is located between the first shield and the second shield in the first direction, and the fourth shield is located between the first shield and the second shield in the first direction.

9. The magnetic head according to claim 1, wherein the third shield further includes a fifth partial region, the first partial region is located between the second partial region and the fifth partial region in the first direction, the fourth shield further includes a sixth partial region, the third partial region is located between the fourth partial region and the sixth partial region in the first direction, and the portion of the second shield is located between the fifth partial region and the sixth partial region in the second direction.

10. The magnetic head according to claim 1, further comprising:

a first magnetic layer, the first magnetic layer including at least one selected from the group consisting of IrMn, PtMn, FeMn and NiMn, and the first shield being provided between the first magnetic layer and the third shield, between the first magnetic layer and the first magnetic member, and between the first magnetic layer and the fourth shield in the first direction.

11. The magnetic head according to claim 1, further comprising:

a first magnetic layer; and a second magnetic layer, the first magnetic layer and the second magnetic layer including at least one selected from the group consisting of IrMn, PtMn, FeMn and NiMn, the first magnetic layer being provided between the third shield and the second shield in the first direction, the second magnetic layer being provided between the fourth shield and the second shield in the first direction, and the portion of the second shield being provided between the first magnetic layer and the second magnetic layer in the second direction.

12. The magnetic head according to claim 1, further comprising:

a first magnetic portion, a third direction from the first magnetic member to the first magnetic portion crossing a plane including the first direction and the second direction.

13. The magnetic head according to claim 1, wherein the first shield includes a first shield side face facing the third shield in the second direction, the first shield side face is inclined with respect to the first direction.

14. The magnetic head according to claim 1, wherein the first magnetic member includes a first magnetic member side face facing the first partial region in the second direction, and the first magnetic member side face is inclined with respect to the first direction.

15. The magnetic head according to claim 1, wherein the first magnetic member includes at least one selected from the group consisting of CoMnGa, CoMnAl and FePt.

16. The magnetic head according to claim 1, wherein a third shield thickness along the first direction of the third shield is thicker than a first magnetic member thickness along the first direction of the first magnetic member.

17. The magnetic head according to claim 1, wherein the third shield thickness is not less than 10 nm and not more than 100 nm.

18. A magnetic recording device, comprising:
the magnetic head according to claim 1;
a first circuit; and
a second circuit,
the first circuit being configured to supply a current between the third terminal and the fourth terminal, and
the second circuit being configured to detect a voltage between the first terminal and the second terminal.

19. The magnetic recording device according to claim 18, further comprising:
a magnetic recording medium,
the voltage being configured to change according to information recorded on the magnetic recording medium.

* * * * *